United States Patent Office 2,890,207
Patented June 9, 1959

2,890,207
MALEIMIDE POLYMERS

Eugene A. Kraiman, Irvington, N.J., assignor to Union Carbide Corporation, a corporation of New York No Drawing. Application November 28, 1956
Serial No. 624,748

7 Claims. (Cl. 260—78)

This invention relates to novel polymer of an N,N'-bis-maleimide and an alpha pyrone. More particularly, this invention concerns tough, high softening, thermoplastic polymeric products made by the reaction of an N,N'-bis-maleimide represented by the general formula:

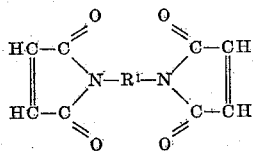

wherein $R^1$ represents a divalent hydrocarbon group, such as an alkylene, arylene, aralkylene, or alkarylene group, with an alpha pyrone represented by the general formula:

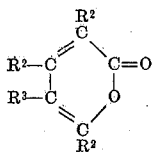

wherein $R^2$ represents a hydrogen or lower alkyl group and $R^3$ represents a hydrogen, alkyl, or carbalkoxy group. The reaction is accomplished by heating a mixture of the two monomers in an inert halogenated aromatic solvent to an elevated temperature at least sufficient to initiate evolution of carbon dioxide and maintaining the reaction mixture at the elevated temperature until the polymerization is substantially complete. The reaction is best conducted at a temperature of at least 150° C. and preferably between about 200° C. and 260° C. At temperatures below about 150° C., reaction rate is so slow that polymerization at such lower temperatures is not practical. The mixture of these monomers polymerizes at a reasonable rate in the solvent upon heating to above about 150° C. A noticeable evolution of carbon dioxide accompanies the reaction. This has led me to believe that the two monomers first condense into a Diels-Alder adduct from which carbon dioxide splits off, and the resultant compound then polymerizes with itself to produce the polymeric product. The reactions appear to go according to the following simplified scheme:

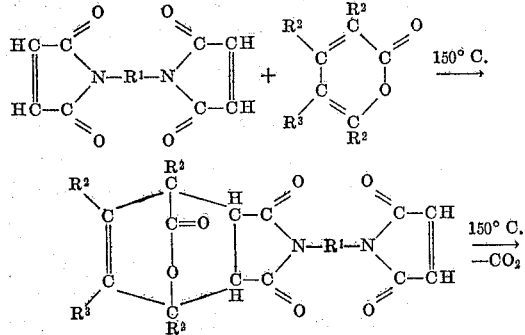

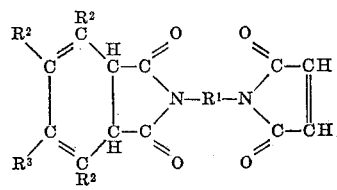

which then polymerizes into a polymer believed to have the structure:

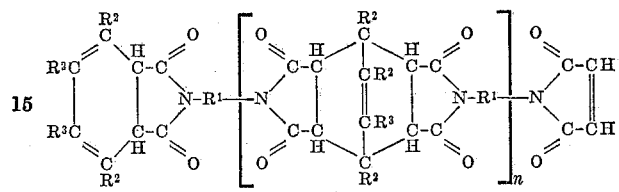

wherein $n$ represents an integer such that the products will have a sufficiently high molecular weight as to give the products a reduced viscosity of from about 0.01 to 0.7 measured at 25° C. as a 0.4 gram sample in 100 ml. of dimethylformamide. Since the products are more conveniently characterized by reduced viscosity methods, they are preferred for indicating the degree of polymerization of the product.

It is to be noted that this reaction scheme is shown for equimolar amounts of the monomers. While it is not necessary in the practice of this invention to employ equimolar amounts of the monomer, these amounts, I have found, will produce the highest molecular weight product. Products made employing a greater molal percent on one monomer will have a correspondingly reduced average molecular weight with the terminal groups of the polymer being of the monomer employed in the greatest amount. Use of extremely low amounts of one reactant compared to the other will, as expected, produce only low molecular weight resins in very low yields and is not to be desired. The products of this invention which have been found to be useful resins are those having reduced viscosities from 0.01 to about 0.7 determined as hereinbefore set forth. The most desirable thermoplastic polymers produced have reduced viscosities in excess of about 0.1. In order to achieve such viscosities, the bis-maleimide and alpha pyrone preferably are employed in about equimolar amounts.

The N,N'-bis-maleimides useful in this invention are conveniently prepared from maleic anhydride and a diamine in a manner such as described in U.S. Patent 2,444,536. This process basically consists of reacting maleic anhydride with an appropriate diamine to yield a bis-maleamic acid according to the following scheme:

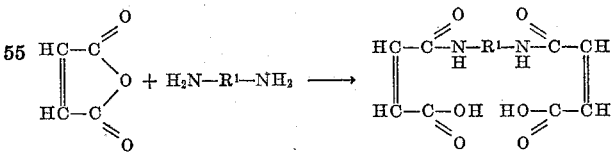

where $R^1$ is a divalent hydrocarbon group, such as an alkylene, arylene, aralkylene, or alkarylene group and substituted derivatives thereof. The maleamic acid formed is then reacted with acetic anhydride and anhydrous sodium acetate to yield the desired N,N'-bis-maleimide, according to the following scheme:

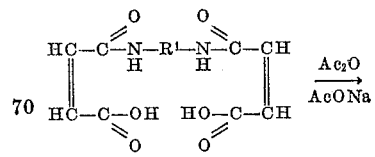

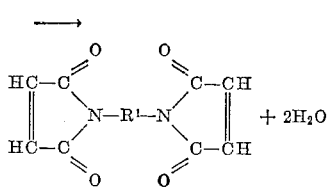

Bis-maleimides prepared in any other manner are likewise useful in this process.

The diamine employed in this preparation of the bis-maleimide determines the divalent radical connecting the maleimide groups, designated as $R^1$. Since the $R^1$ group does not enter into the reaction, it can be an aliphatic or aromatic hydrocarbon group, such as alkylene, arylene, alkarylene, and aralkylene groups and substituted derivatives thereof, preferably containing from 1 to about 20 carbon atoms. For instance, $R^1$ can be methylene, ethylene, propylene, butylene, hexamethylene, decamethylene, phenylene, biphenylene, tolylene, ditolylene, a xylylene group, a diphenyl methane group, or alkyl substituted diphenyl methane groups such as tetramethyl diphenyl methane, diphenyl propane, diethyl diphenyl methane, or naphthalene groups and alkyl derivatives thereof, and like compounds.

The alpha pyrones employed in producing the novel polymeric products of this invention can be characterized by the following general formula:

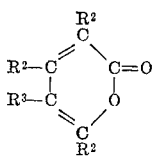

wherein $R^2$ represents a hydrogen or lower alkyl group and $R^3$ represents a hydrogen, alkyl, or carbalkoxy group. The preferred compounds are those containing $R^2$ and $R^3$ groups containing less than about 6 carbon atoms. These compounds can be prepared by reactions as described in U.S. Patent 2,529,917, for instance, by reacting ethylacetoacetate in the presence of anhydrous hydrogen chloride, or in the manner described in U.S. Patent 2,607,781.

In this process I have found it necessary to provide sufficient liquid reaction media for carrying out the reaction. This is accomplished most conveniently by use of a solvent inert to the monomers and product and in which the monomers and polymeric products are soluble. Halogenated aromatic compounds, particularly the chlorinated and brominated aromatic compounds having boiling points of above 150° C. have been found to be very efficient for this purpose and are preferred. Solvents such as bromobenzene, chloronaphthalene, chlorotoluene, bromotoluene, and the like are particularly desirable solvents. By dissolving the monomers in the solvent and heating to the refluxing temperature of the mixture, the reaction temperature can be easily controlled until the reaction is substantially complete or the desired product molecular weight is obtained. These polymeric products are stable at refluxing temperatures for 72 hours or more, although reaction time of 30 to 60 minutes is generally all that is necessary if the monomer concentration in the solvent is kept high. Although if desired, extended reaction times can be employed.

If desired, solvents having a boiling point below 150° C. for instance, chlorobenzene, can be employed with the pressure in the system increased above atmospheric so that the reaction mixture can be heated to at least 150° C. If desired, subatmospheric pressures can likewise be employed to lower the refluxing temperature of the reaction mixture. Alternatively, the reaction temperature can be controlled by other external or internal means of temperature regulation.

While it has been found necessary to provide a fluid reaction medium it is preferred that the solvent be employed in amounts as low as possible. Generally, the greater the monomer concentration in the solvent, the higher the reduced viscosity obtainable, and thus the molecular weight, of the resulting polymer. However, if insufficient solvent is employed, the reaction mixture is difficult, if not impossible, to stir, and to maintain a uniform reaction temperature. Occasional gellation of the polymer in the reaction mixture is sometimes noticed in which case a lower monomer concentration may be desirable. Incomplete reaction or side reactions may tend to occur if monomer concentration is too low, which results in a lower yield and lower molecular weight of the polymer. In this manner, solvent content of the reaction mixture has a direct influence on the molecular weight of the polymer produce, and ideal solvent concentration will depend in each case on the products desired and the reactants employed. In most applications, it is desired that the monomer content in the solvent be kept as high as possible, preferably in the range of about 15 to 35 parts by weight of monomers to 100 parts by weight of solvent.

Recovery of the polymer produced in this reaction is readily accomplished by precipitation in excess methanol, followed by washing, filtering, and drying. Nearly quantitative yields of polymer are secured, i.e. about 95–100 percent. Precipitation methods for recovering the product are preferred although other methods for recovery can be used, for instance, stripping off the solvent under reduced pressures is possible.

The products of this invention are hard, tough, thermoplastic polymers. These polymers have high softening points, generally at least 150° C. and more commonly closer to 300° C. or above. The products produced from aromatic bis-maleimides generally have higher softening temperatures than do those from aliphatic bis-maleimides, and can range from 300° C. to 500° C. The products of this invention are soluble in most halogenated aromatic solvents, such as chlorobenzene, bromobenzene, chlorotoluene, bromotoluene, chloronaphthalene, and bromonaphthalene and in dimethylformamide. The lower softening polymers can be compression molded at temperatures of about 250° C. or cast into sheets or films from solution. The higher softening polymers can be cast from solution. The polymers are non-crystalline and non-orientable, generally having second order transitional temperatures about their softening temperatures.

Other properties of these polymeric products are particularly interesting and suggest many specific applications. Along with the high softening points, the polymers have high strengths and good electrical properties. While the polymers are not too suitable to molding at low temperatures, films can be prepared from the polymer by dissolving the polymer in a solvent and casting the solution onto a glass plate or other suitable hard flat surface. Films of these polymers have exceptionally high tensile strengths for non-crystalline polymers, and have excellent electrical properties and resistance to dilute alkali and acid solutions. Degradation even at temperatures of 200° C. or higher is very slow which makes these polymers ideal for high temperature electrical work such as in class B motors, insulating tapes and electronic tubes and also as varnishes for insulating or high temperature applications.

The following examples are illustrative.

*Example 1*

A mixture of 0.980 gram (0.05 mole) of 4,6-dimethyl-5-carbethoxy-alpha pyrone and 1.38 grams (0.05 mole) of hexamethylene-bis-maleimide was heated in a flask with 25 ml. of bromobenzene to refluxing (~155° C.), and maintained under refluxing conditions for 72 hours. After this period, the mixture was added to excess methanol. The polymeric material produced in the reaction precipitated, was filtered from the methanol solution and dried in an oven. The dried weight of product was 1.7 grams, which indicated a yield of 81 percent of theoretical.

The dried polymeric material was an almost colorless powder softening at about 195° C. The product had a reduced viscosity of 0.38 at 25° C. as determined by dissolving ~0.4 gram of the product in 100 ml. of dimethyl formamide with viscosity measurements made on a Cannon-Fenske viscometer. The product was soluble in chlorinated hydrocarbons and dimethyl formamide. Films could be cast from solutions of the polymer in one of the solvents to achieve a clear, colorless, tough film. The polymeric product could be molded at temperatures approaching its softening point to produce a tough rigid sheet.

Example 2

A mixture of 0.980 gram (0.05 mole) of 4,6-dimethyl-5-carbethoxy-alpha pyrone and 2.07 grams (0.05 mole) of 3,5 3',5'-tetramethyl-4,4'-diphenylmethane-bis-maleimide was heated in a flask with 25 ml. of bromobenzene to refluxing (~155° C.), and maintained under refluxing conditions for 72 years. After this period, the mixture was added to excess methanol. The polymeric material produced in the reaction precipitated, was filtered from the methanol solution and dried in an oven. The dried weight of product was 2.6 grams which indicated a yield of 93 percent of theoretical.

The dried polymeric material was an almost colorless powder having a softening point at greater than 300° C. The product had a reduced viscosity of 0.15 at 25° C. as determined by dissolving ~0.4 gram of the product in 100 ml. of dimethyl formamide with viscosity measurements made on a Cannon-Fenske viscometer. The product was soluble in dimethylformamide. Films could be cast onto glass plates from the solution and the dimethylformamide driven off in a vacuum oven, yielding a transparent film having high physical strengths and good electrical insulating qualities.

Example 3

A polymeric product of 3,5 3',5'-tetramethyl-4,4'-diphenylmethane-bis-maleimide and 4,6-dimethyl-5-carbethoxy-alpha pyrone was prepared in the manner of Example 1 using equimolar amounts of the two reactants and bromobenzene as a solvent. The product had a softening point greater than 300° C., and a reduced viscosity of 0.15 at 25° C. as determined by dissolving 0.4 gram of the product in 100 ml. of dimethylformamide, as measured on a Cannon-Fenske viscometer. This product could likewise be cast into hard, tough, clear films as in Examples 1 and 2.

What is claimed is:
1. A normally solid thermoplastic resinous heat reaction product of about equimolar amounts of N,N'-bis-maleimide having the general formula

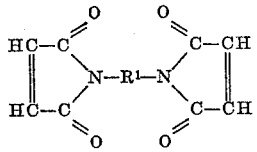

wherein $R^1$ is a divalent hydrocarbon group, and of an alpha pyrone having the general formula

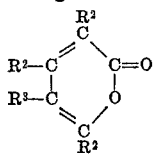

wherein $R^2$ represents a member selected from the group consisting of hydrogen and lower alkyl groups and $R^3$ represents a member selected from the class consisting of hydrogen, alkyl, and carbalkoxy groups.

2. A normally solid thermoplastic resinous heat reaction product produced from about equimolar amounts polymerized therein of an N,N'-bis-maleimide having the general formula

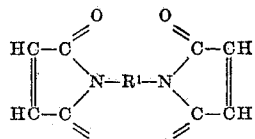

wherein $R^1$ is a divalent hydrocarbon group, and of an alpha pyrone having the general formula

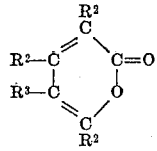

wherein $R^2$ represents a member selected from the group consisting of hydrogen and lower alkyl groups and $R^3$ represents a member selected from the class consisting of hydrogen, alkyl, and carbalkoxy groups, said resinous product characterized by the structure

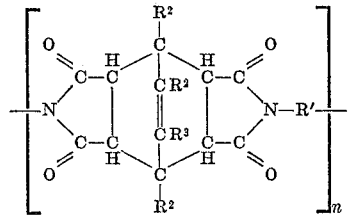

wherein $R^1$, $R^2$ and $R^3$ are as characterized above and $n$ is an integer such that the products have a reduced viscosity at 25° C. of from about 0.01 to about 0.7 measured as a 0.4 gram sample of the product in 100 ml. of dimethylformamide.

3. A solid thermoplastic polymeric heat reaction product of an N,N'-bis-maleimide having the general formula

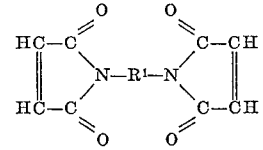

wherein $R^1$ is a divalent radical selected from the group consisting of alkylene, arylene, aralkylene and alkarylene radicals, and about an equimolar amount of 4,6-dimethyl-5-carbethoxy-alpha pyrone, characterized by having a reduced viscosity at 25° C. of from about 0.01 to about 0.7 measured as a 0.4 gram sample of the product in 100 ml. of dimethylformamide.

4. A process for preparing a thermoplastic polymeric product which comprises heating in the presence of an inert solvent for reactants and products to provide a liquid reaction media, an N,N'-bis-maleimide having the general formula

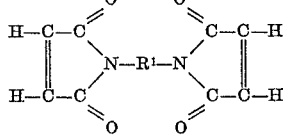

wherein $R^1$ is a divalent hydrocarbon, with an alpha pyrone having the general formula

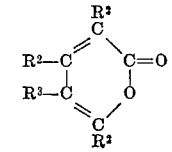

wherein $R^2$ represents a member selected from the group consisting of hydrogen and lower alkyl groups and $R^3$ represents a member selected from the class consisting of hydrogen, alkyl, and carbalkoxy groups to an elevated temperature at least sufficient to initiate the evolution of carbon dioxide.

5. A process for preparing a thermoplastic polymeric product which comprises heating in the presence of an inert halogenated aromatic hydrocarbon solvent present in amounts to provide a liquid reaction media, about equimolar amounts of an N,N-bis-maleimide having the general formula

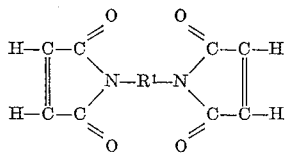

wherein $R^1$ is a divalent hydrocarbon, and an alpha pyrone having the general formula

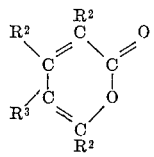

wherein $R^2$ represents a member selected from the group consisting of hydrogen and lower alkyl groups and $R^3$ represents a member selected from the class consisting of hydrogen, alkyl, and carbalkoxy groups to an elevated temperature at least sufficient to initiate the evolution of carbon dioxide and polymerize the mixture.

6. A process according to claim 3 wherein the said aromatic solvent is present in amounts of about 100 parts by volume to from about 20 to about 40 parts by weight of total reactants.

7. A process for preparing a thermoplastic polymeric product which comprises heating in the presence of an inert solvent for reactants and products to provide a liquid reaction media, an N,N'-bis-maleimide having the general formula

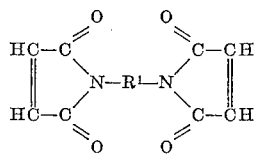

and 4,6-dimethyl-5-carbethoxy-alpha pyrone present in about equimolor amounts to a temperature of at least 150° C., and recovering the polymer thus produced.

No references cited.